United States Patent [19]

Fazis

[11] Patent Number: 5,566,597
[45] Date of Patent: Oct. 22, 1996

[54] METHOD OF PRODUCING A TORUS SURFACE ON A LATHE WORK

[75] Inventor: Harald Fazis, Weil am Rhein, Germany

[73] Assignee: Ludwig Boschert Maschinen-und Apparatebau GmbH & Co. KG, Lorrach, Germany

[21] Appl. No.: 230,103

[22] Filed: Apr. 20, 1994

[30] Foreign Application Priority Data

May 4, 1993 [DE] Germany .......................... 43 14 723.2

[51] Int. Cl.⁶ ................................................ B23B 1/00
[52] U.S. Cl. .................................... 82/1.11; 22/12
[58] Field of Search ............................. 82/1.11, 12, 104, 82/131

[56] References Cited

U.S. PATENT DOCUMENTS

| | | | |
|---|---|---|---|
| 3,064,510 | 11/1962 | Floyd | 82/12 |
| 3,447,245 | 6/1969 | Holdridge | 82/12 |
| 3,611,845 | 10/1971 | Weidner | 82/12 |
| 4,817,213 | 4/1989 | Scobie | 82/12 |

*Primary Examiner*—M. Rachuba
*Assistant Examiner*—Kenneth J. Hansen
*Attorney, Agent, or Firm*—Ratner & Prestia

[57] ABSTRACT

To prepare an essentially toroidal surface (7) on a workpiece (1) by machining, rotation of the workpiece around a first axis of rotation (3) and at the same time a rotation of the cutting tool (8) used for this machining around a second axis of rotation (10) are provided, wherein the second axis of rotation passes through the predetermined center (4) of the circular surface of the torus, which yields the surface (7) to be machined of the workpiece (7) during the rotation of the workpiece (1) around the first axis of rotation (3).

9 Claims, 2 Drawing Sheets

METHOD OF PRODUCING A TORUS SURFACE ON A LATHE WORK

FIELD OF THE INVENTION

The present invention pertains to a method and a device for preparing an essentially toroidal surface on workpiece by machining. Such an essentially toroidal surface is provided, e.g., on the circumference of a handwheel, which is used in the tilting bearings by means of which the winding rods of winding machines, which wind up and unwind webs of material in the paper or textile industry, are mounted.

BACKGROUND OF THE INVENTION

The above-mentioned handwheels for such tilting bearings are, in general, circular disk-shaped castings, which have reduced material thickness in the center of the disk compared with the circumference of the disk. The circumference of the disk is therefore thickened in the manner of a torus and leads to an essentially toroidal circumferential surface, which extends between the two front-side surfaces of the disk over an angle of circumference of about 270° in relation to the center of the circular surface, which forms the radial cross section of this toric disk circumference. The value of this angle of circumference of greater than 180° is predetermined by the reduced thickness of material in the center of the disk. Depending on the deviating size of the material thickness in the center of the disk, the angle of circumference may consequently also be greater or smaller than 270°, as a consequence of which the toroidal circumferential surface of the handwheel will also be correspondingly larger or smaller for the machining.

Machining of the toroidal circumferential surface of such handwheels has hitherto been performed on a turning machine, in which the cutting tool, which is maintained in contact with the surface being machined on the casting being rotated by the work spindle of the turning machine, is clamped onto the slide of the cutting machine. However, this arrangement of the turning tool does not make it possible to machine the torus surface in one pass over the entire angle of circumference, but the casting must be turned by 180° after a first partial machining of only one part of the toroidal circumferential surface and be remounted on the work spindle of the turning machine, so that the remaining part of the toroidal circumferential surface can then be machined from the opposite front surface of the casting. Not only is this machining correspondingly time-consuming and expensive, but it is also impossible to achieve a better surface finish by this machining, so that the machining with the turning tool usually must be followed by a finishing for preparing the desired polished surface.

SUMMARY OF THE INVENTION

The present invention, which is characterized by the patent claims, accomplishes the object of developing a method and a device for preparing an essentially toroidal surface on a workpiece work by machining such that the torus surface can be machined to the finished state without interruption of the machining beginning from the first contact position of the cutting tool, and a better surface finish of the machined surface of the workpiece can be achieved at the same time.

The rotation of the cutting tool around a second axis of rotation, which rotation is provided according to the present invention, wherein the second axis of rotation extends at right angles to the first axis of rotation provided for the rotation of the workpiece and passes through the predetermined center of the circular surface of the torus, which yields the surface to be machined of the workpiece during the rotation of the lathe work around the first axis of rotation, provides the decisive prerequisite for the cutting tool to be now able to be moved without any interruption of the contact position for, e.g., the toroidal circumferential surface of a handwheel for a tilting bearing over its full angle of circumference of, e.g., about 270° between a starting position and an end position. Not only is the change-over time previously needed for turning the workpiece made unnecessary by this uninterrupted rotary movement of the cutting tool in relation to the workpiece, but an improvement of the surface finish is thus also achieved at the same time, because the formation of any cutting burrs at the transition between the partial surfaces machined consecutively, which has hitherto usually been unavoidable because of the turning, is avoided. The machining itself can be adjusted to such a fineness that a nearly polished surface, which makes a further finishing of the handwheel unnecessary, is obtained. The device provided for carrying out the method can also be designed as an inexpensive attachment for an existing turning machine, with which it is also possible to machine handwheels of different sizes without any time-consuming change-over.

BRIEF DESCRIPTION OF THE DRAWINGS

One exemplary embodiment of a device according to the present invention is schematically represented in the drawing and is explained in greater detail below. In the drawing.

DETAILED DESCRIPTION OF THE INVENTION

Figure 1:
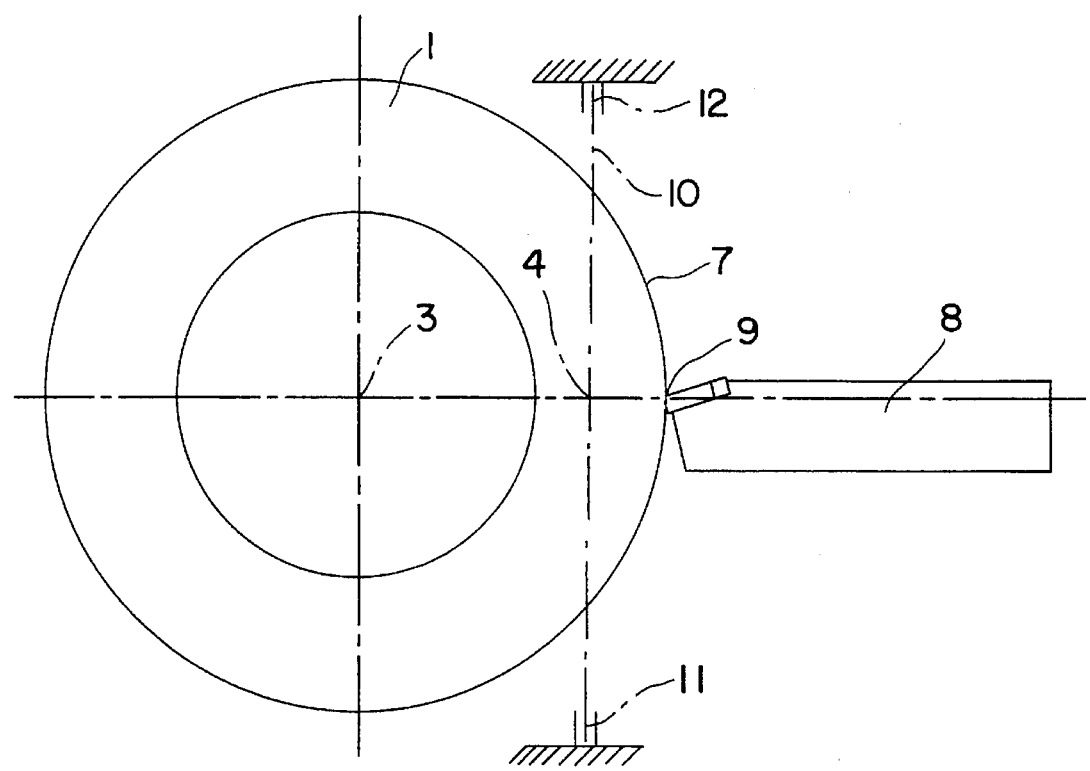
FIG. 1 shows a schematic representation for the more detailed explanation of the basic principle of the method according to the present invention during the machining of a handwheel, shown in a front view, for a tilting bearing.
Figure 2:
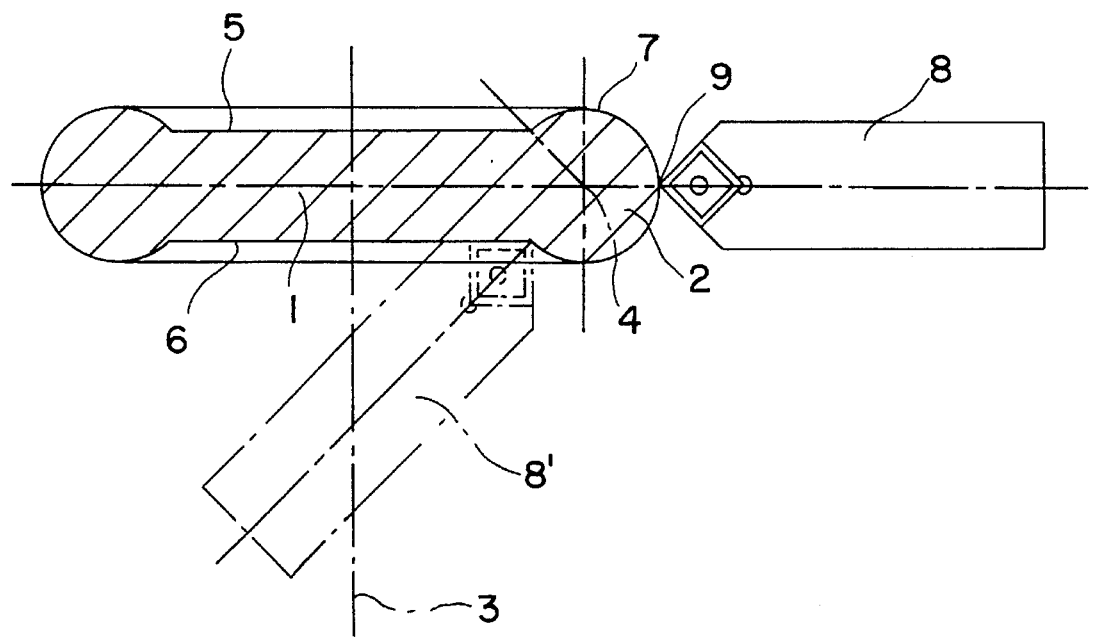
FIG. 2 shows a sectional view of the schematic representation according to FIG. 1.

The schematic representation in FIGS. 1 and 2 shows a handwheel intended for use in a tilting bearing as a circular disk-shaped workpiece 1, in which the material thickness in the center of the disk is reduced compared with the circumference of the disk. The disk circumference, which has thus been thickened in a toroidal shape, is represented as a torus, which is obtained by rotating a circular surface 2 around an axis of rotation 3. However, the circular surface 2 extends only over an angle of circumference of ca. 270° in relation to the center 4 of the circle, and ends in the two front surfaces 5 and 6 of the center of the disk, to which the axis of rotation 3 is directed at right angles.

A cutting tool 8, whose cutting point 9 is directed toward a radial plane of the workpiece 1, is provided for machining the circumferential surface 7 of the lathe work 1, which is thus essentially a toroidal surface and extends over the above-mentioned angle of circumference of about 270° of the circular surface 2 in relation to the center 4 of the circle. The said cutting point 9 is maintained in contact with the toroidal circumferential surface 7 of the workpiece 1. To machine this surface, a first axis of rotation, around which the lathe work is rotated during the machining by, e.g., the work spindle of a turning machine, is now provided with the axis of rotation 3 of the said workpiece 1. Besides the first axis of rotation 3, a second axis of rotation 10 is provided, which extends at right angles to the said first axis of rotation 3 and passes through the center 4 of the circular surface 2 and consequently of the torus, which forms the surface 7 to be machined of the workpiece during the rotation of the lathe work 1 around the first axis of rotation 3. The second axis of rotation 10 is therefore provided for rotating the cutting tool 8 in relation to the workpiece 1, e.g., between the starting position 8' shown by dash-dotted line in FIG. 2 and an end position, into which the cutting point 9 of the cutting tool 8 is moved during a machining of the surface 7 over the above-mentioned angle of circumference of about 270°. Two pivot bearings 11 and 12, which secure the vertical orientation of the axis of rotation 10 in the case of horizontal orientation of the first axis of rotation 3, are also indicated in FIG. 1 for the axis of rotation 10, and, as was mentioned above, this vertical orientation passes through the center 4 of the circular surface 2.

Figure 3:
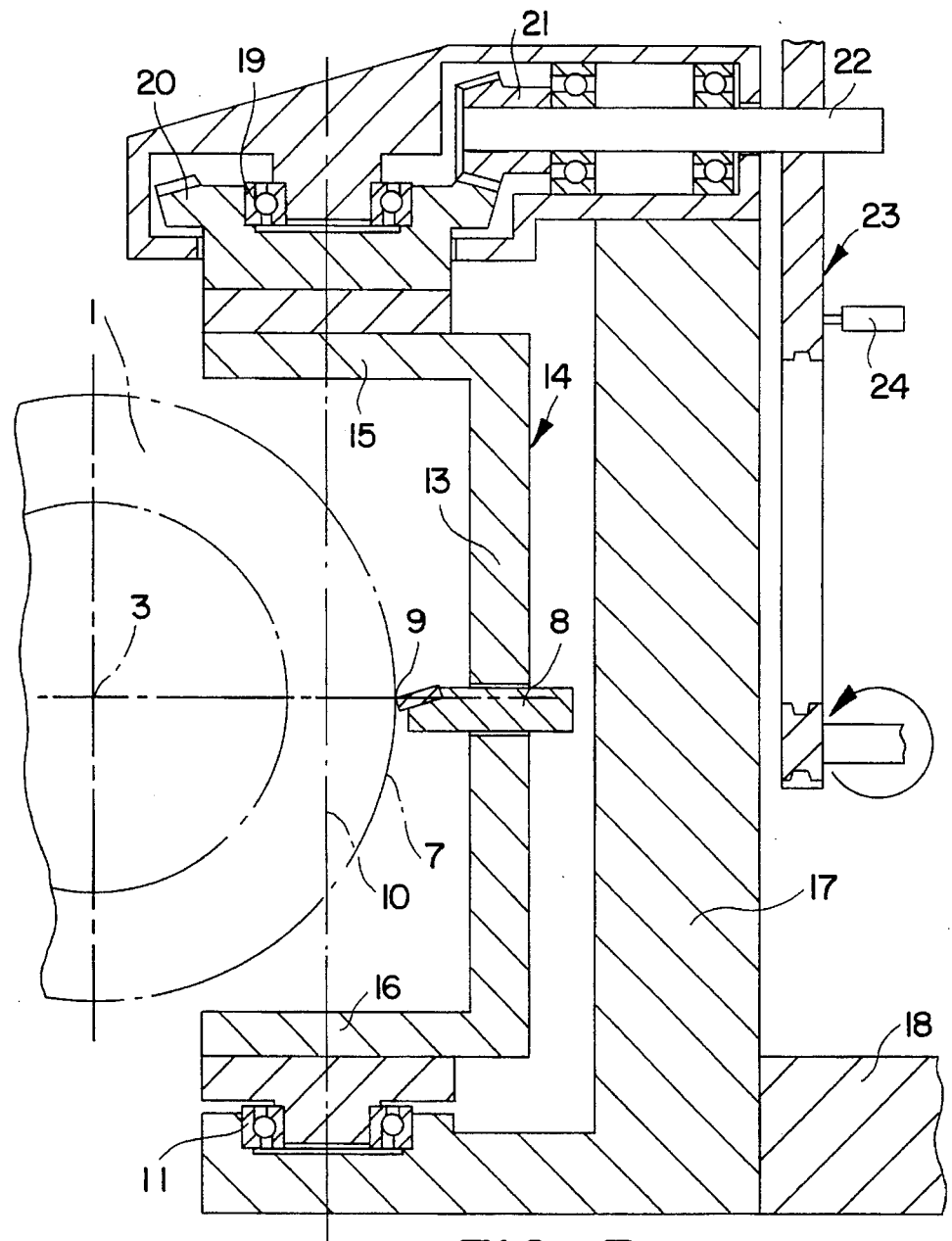
FIG. 3 shows a sectional view of the device designed corresponding to this schematic representation for machining a handwheel for a tilting bearing.
Figure 4:
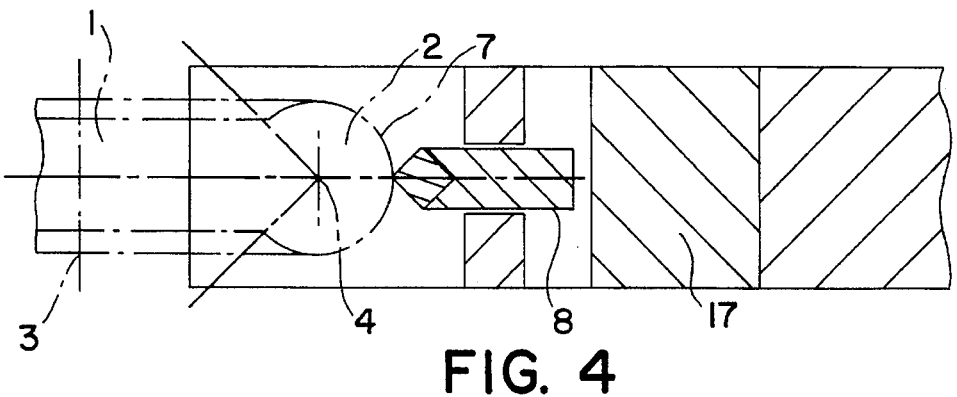
FIG. 4 shows a top view of a cross section of the device.

For a practical embodiment of the device, attachment of the turning tool 8 to the web 13 of a tool holder 14 of an essentially U-shaped design is provided, wherein the second axis of rotation 10 is rotatably supported, via the two legs 15 and 16 of the said tool holder 14, e.g., at a bracket 17. The bracket 17 may be fastened to the slide of the turning machine, which is schematically indicated with the fastening part 18. FIG. 3 shows only the lower support bearing 11 of the second axis of rotation 10. The upper support bearing is represented as a pivot bearing 19 for a worm gear 20, which is a component of a gear pair include for a motor drive of the tool holder 14 and meshes with a drive worm 21, whose drive shaft 22 can be driven via a belt drive 23 by an actuator (not shown). The feed, at which the said cutting tool 8 is moved over the surface 7 to be machined of the workpiece 1 with the motor actuator turned on is influenced by the gear mechanism designed with the worm gears 20, 21 as well as by the belt drive 23. This machining can also be repeated several times, depending on an initially preset depth of cut of the cutting tool 8. If repeated machining is preset for achieving a higher surface finish, consecutive feed of the depth of cut is performed at at least one of the two end positions of the cutting tool 8, i.e., e.g., in the starting position 8'. The cutting tool can be set at this starting position at the beginning of the machining by providing a grip part, with which the tool holder 14 can be rotated around the axis of rotation 10 in cooperation with the worm gears 20, 21, with the motor actuator disengaged, at the driven pulley of the belt drive 23.

The feed of the depth of cut of the cutting tool 8 may be performed, e.g., by means of the slide of the turning machine. This feed, which is consequently an indirect feed, can be coupled with the reversal of the rotary movement of the tool holder 14. As an alternative, a separate attaching means can be provided for the turning tool 8 at the tool holder 14 in order to set the depth of cut of the cutting tool also correspondingly directly in relation to the surface to be machined of the workpiece 1 via an adjustment of the said attaching means in relation to the tool holder. Finally, it is also conceivable to bring about a change in the distance from the said second axis of rotation 10 by mounting the tool holder 14 by means of cam plates at the bracket 17, in which case the depth of cut of the cutting tool 8 is fed with this change in distance.

What is claimed:

1. A method of machining an essentially toroidal surface on a work piece where the toroidal surface is formed by rotation of a circular surface around a first axis along a radius of rotation, the circular surface having a circumference of about 270 degrees and a center where the radius of rotation is defined by (1) the center and (2) the first axis of rotation which is spaced from the center of the circular surface, the work piece arranged for rotation around the first axis while being in contact with a cutting tool at a circumferentially extending surface thereof, the method comprising the steps of:

(a) rotating the circular surface around the first axis along the radius of rotation to obtain a toms of which the toroidal surface forms a portion; and (b) rotating the cutting tool without interruption through an angle of about 270 degrees around a second axis of rotation to form the essentially toroidal surface where the second axis of rotation extends at a right angle to the first axis and passes through the center of the circular surface.

2. The method in accordance with claim 1, wherein the toroidal surface (1) extends on the circumference of a handwheel for a tilting bearing and (2) extends circumferentially over an arc of about 270 degrees of the circumference of the circular surface, the arc has an arc center located at the center of the circular surface.

3. The method in accordance with claim 2, wherein the cutting tool has a cutting depth and wherein step (c) further comprises reversing the rotation of the cutting tool around the second axis when the cutting tool reaches the end position or the starting position, and progressively increasing the cutting depth of the cutting tool at at least one of the starting position and the end position.

4. The method in accordance with claim 1, wherein the cutting tool has a cutting depth, and the cutting depth of the cutting tool is regulated as a function of a rate at which the turning tool is rotated around the second axis of rotation.

5. The method in accordance with claim 1, in which the rotation of the cutting tool around the second axis of rotation is driven by a motor.

6. The method according to claim 5, wherein the motor drives the rotation of the cutting tool using a gear mechanism.

7. The method in accordance with claim 1, in which the rotation of the work piece around the first axis of rotation as performed on a turning machine having a work spindle which has a horizontal axis, and the rotation of the cutting tool around the second axis of rotation is performed using a tool holder, wherein the first axis of rotation corresponds to the horizontal axis of the work spindle of the turning machine and the second axis of rotation of the tool holder is oriented horizontally.

8. The method according to claim 6, wherein the tool holder is coupled to a slide on the turning machine to provide the second axis of rotation.

9. The method according to claim 1, wherein the cutting tool is mounted on a holder and the method further comprises the step of rotating the holder around the second axis of rotation to rotate the cutting tool.

\* \* \* \* \*

UNITED STATES PATENT AND TRADE MARK OFFICE
CERTIFICATE OF CORRECTION

PATENT NO.    : 5,566,597
DATED         : October 22, 1996
INVENTOR(S)   : Harald Fazis It is certified that error appears in the above-identified patent and that said Letters Patent is hereby corrected as shown below:

Column 4, line 16, claim 1, after "obtain a" delete "toms" and insert --torus--.

Column 4, line 48, claim 7, after "rotation" delete "as" and insert --is--. (2nd occur.)

Signed and Sealed this

Eighteenth Day of March, 1997

Attest:

BRUCE LEHMAN

*Attesting Officer*                *Commissioner of Patents and Trademarks*